United States Patent
Brooks

(10) Patent No.: US 9,295,226 B2
(45) Date of Patent: Mar. 29, 2016

(54) BATTERY-POWERED ANIMAL FEEDER HAVING IMPROVED METERING

(75) Inventor: Steve Brooks, Pyrford (GB)

(73) Assignee: PET MATE LTD., Hersham, Surrey (GB)

( * ) Notice: Subject to any disclaimer, the term of this patent is extended or adjusted under 35 U.S.C. 154(b) by 0 days.

(21) Appl. No.: 13/005,187

(22) Filed: Jan. 12, 2011

(65) Prior Publication Data

US 2011/0174224 A1    Jul. 21, 2011

(30) Foreign Application Priority Data

Jan. 15, 2010 (GB) .................................. 1000613.8
Feb. 18, 2010 (GB) .................................. 1002786.0

(51) Int. Cl.
*A01K 5/02* (2006.01)
*A01K 5/01* (2006.01)

(52) U.S. Cl.
CPC ............. *A01K 5/0291* (2013.01); *A01K 5/0275* (2013.01); *A01K 5/0114* (2013.01); *A01K 5/0258* (2013.01)

(58) Field of Classification Search
CPC ......... A01K 5/00; A01K 5/0114; A01K 5/02; A01K 5/0225; A01K 5/0258; A01K 5/0275; A01K 5/0291
USPC ........ 119/57.1, 57.92, 51.01, 51.11, 52.1, 53; 310/68 D
See application file for complete search history.

(56) References Cited

U.S. PATENT DOCUMENTS

| | | | | |
|---|---|---|---|---|
| 3,031,063 A | * | 4/1962 | Siebring ................... | 198/550.1 |
| 3,481,512 A | * | 12/1969 | Scheffer et al. ............ | 222/413 |
| 3,710,983 A | * | 1/1973 | Ricciardi ................... | 222/141 |
| 3,756,372 A | * | 9/1973 | Mertens ................... | 198/495 |
| 3,962,997 A | * | 6/1976 | Ruth ....................... | 119/51.11 |
| 4,051,812 A | * | 10/1977 | DeLoach et al. ........... | 119/51.11 |
| 4,079,699 A | * | 3/1978 | Longmore et al. ......... | 119/51.11 |
| 4,279,221 A | * | 7/1981 | Arvizu ..................... | 119/51.11 |
| 4,292,930 A | * | 10/1981 | Olsen ....................... | 119/51.11 |
| 4,361,117 A | * | 11/1982 | Tohme .................. | F04B 7/0053 119/57.6 |
| 4,495,894 A | * | 1/1985 | Swartzendruber ........... | 119/57.2 |
| 4,508,061 A | * | 4/1985 | Swearingin ................ | 119/51.01 |

(Continued)

FOREIGN PATENT DOCUMENTS

| | | |
|---|---|---|
| CN | 2501310 Y | 7/2002 |
| EP | 0514291 A2 | 11/1992 |

(Continued)

*Primary Examiner* — Monica Williams
*Assistant Examiner* — Michael A Fabula
(74) *Attorney, Agent, or Firm* — Manelli Selter PLLC; Edward J. Stemberger

(57) ABSTRACT

A feeder for feeding animals selected from domestic pets, cage birds, chickens, fish and wild birds. A hopper holds feed, an electric motor and a battery holder A chamber receives feed from the hopper, and has a discharge outlet for discharge of feed. An augur is mounted for rotation and receives drive from the electrical motor. As the augur rotates, it moves feed along the chamber towards the discharge outlet. An indexing mechanism indexes individual turns of the augur. The feeder supplies feed to the discharge outlet in metered amounts. The feeder is formed as two units, namely a base unit with a hopper unit mounted on the base unit. The base unit mounts the electric motor and battery holder. The hopper unit includes the hopper itself, the chamber and the augur. The hopper unit is freely separable from the base unit for cleaning or for filling the hopper.

8 Claims, 4 Drawing Sheets

(56) References Cited

U.S. PATENT DOCUMENTS

| | | | | |
|---|---|---|---|---|
| 4,513,688 A * | 4/1985 | Fassauer | | 119/57.1 |
| 4,665,862 A * | 5/1987 | Pitchford, Jr. | | 119/51.11 |
| 4,699,265 A * | 10/1987 | Houle | | 198/575 |
| 4,722,300 A * | 2/1988 | Walker et al. | | 119/51.11 |
| 4,735,171 A * | 4/1988 | Essex | | 119/51.12 |
| 4,949,674 A * | 8/1990 | Young | | 119/51.04 |
| 5,150,664 A * | 9/1992 | Kirk | | 119/51.12 |
| 5,154,547 A * | 10/1992 | Young | | 119/51.04 |
| 5,160,068 A * | 11/1992 | Fishman | | G01F 11/24 119/51.02 |
| 5,222,634 A * | 6/1993 | Hayes | | 222/185.1 |
| 5,230,300 A * | 7/1993 | Mezhinsky | | 119/51.11 |
| 5,299,529 A * | 4/1994 | Ramirez | | 119/51.11 |
| 5,315,958 A * | 5/1994 | Forster | | 119/54 |
| 5,328,015 A * | 7/1994 | Volk et al. | | 198/548 |
| 5,363,805 A * | 11/1994 | Wing | | 119/51.11 |
| 5,372,093 A * | 12/1994 | Pooshs | | 119/51.11 |
| 5,381,967 A * | 1/1995 | King | | 239/659 |
| 5,433,171 A * | 7/1995 | Ewell | | 119/51.5 |
| 5,480,061 A * | 1/1996 | Ellinger | | 221/75 |
| 6,082,299 A * | 7/2000 | Halford | | 119/51.04 |
| 6,135,056 A * | 10/2000 | Kuo | | 119/51.11 |
| 6,263,833 B1 | 7/2001 | Runyan et al. | | |
| 6,273,027 B1 * | 8/2001 | Watson et al. | | 119/712 |
| 6,367,417 B1 * | 4/2002 | Gal et al. | | 119/51.5 |
| 6,401,657 B1 | 6/2002 | Krishnamurthy | | |
| 6,540,102 B2 * | 4/2003 | Gates et al. | | 221/75 |
| 6,681,718 B1 * | 1/2004 | McIlarky | | 119/53 |
| 6,789,503 B1 * | 9/2004 | Gao | | 119/51.11 |
| 6,889,630 B1 * | 5/2005 | Wayman | | 119/57.92 |
| 6,988,465 B2 * | 1/2006 | Park | | 119/51.12 |
| 7,270,081 B2 * | 9/2007 | Park | | 119/57.92 |
| 7,392,895 B2 * | 7/2008 | Ottow et al. | | 198/550.6 |
| 7,426,901 B2 * | 9/2008 | Turner et al. | | 119/51.02 |
| 7,500,447 B2 * | 3/2009 | Vaccari | | 119/51.04 |
| 8,074,602 B2 * | 12/2011 | Laliberte | | 119/57.92 |
| 2005/0217591 A1 * | 10/2005 | Turner et al. | | 119/51.02 |
| 2005/0284386 A1 * | 12/2005 | Eversole et al. | | 119/57.1 |
| 2007/0137586 A1 * | 6/2007 | Park | | 119/57.1 |
| 2007/0193524 A1 * | 8/2007 | Turner et al. | | 119/51.02 |
| 2008/0289580 A1 * | 11/2008 | Krishnamurthy | | 119/51.11 |
| 2010/0095895 A1 * | 4/2010 | Laliberta | | 119/56.1 |
| 2010/0269757 A1 * | 10/2010 | Park | | 119/54 |

FOREIGN PATENT DOCUMENTS

| | | | | |
|---|---|---|---|---|
| GB | 1192789 A | | 5/1970 | |
| GB | 2207331 A | | 2/1989 | |
| GB | 2214329 A | * | 8/1989 | A01K 5/0291 |
| GB | 2356190 A | * | 5/2001 | A01K 5/0291 |
| GB | EP 2345324 A1 | * | 7/2011 | A01K 5/0275 |

* cited by examiner

BATTERY-POWERED ANIMAL FEEDER HAVING IMPROVED METERING

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

This disclosure relates to feeders, namely apparatus for feeding animals selected from domestic pets, fish, chickens and wild birds.

2. Description of Related Art Including Information Disclosed Under 37 CFR 1.97 and 37 CFR 1.98.

Pet feeders, such as the C20 Pet Feeder available from Pet Mate Ltd of Hersham, Surrey, which provide one or more meals for a pet at selected times, have proved popular with pet owners as they allow the owner to feed their pet at times when it may not be possible for the owner to be home to feed them directly. The quantity of food supplied is chosen by the pet owner. However such feeders can usually only provide one or two such meals at selected times. A cover opens at the selected time to expose a dish containing the food. Such feeders are particularly suitable for wet foodstuffs such as tinned dogfood or tinned catfood.

The embodiment of feeder described hereinbelow has arisen from our work seeking to develop a feeder system that is specifically configured for dispensing dry feed to pets, chickens, cage birds, fish or wild birds over an extended interval and in metered amounts.

Feeding systems for providing dry feed from a hopper have been proposed previously both for agricultural livestock and for domestic pets, including fish in an aquarium. Prior such pet feeders tend to be difficult to clean.

BRIEF SUMMARY OF THE INVENTION

In accordance with the present disclosure, a feeder for animals selected from domestic pets, cage birds, chickens, fish and wild birds has a hopper adapted to hold a supply of dry feed. An electric motor and a battery holder are adapted to mount at least one battery for driving the motor. A chamber is adapted to receive feed by gravity from a lower portion of the hopper, and having a discharge outlet at one axial end of the chamber for discharge of feed. An auger is mounted for rotation about an axis within said chamber and arranged to receive drive from the electrical motor, the auger being adapted as it rotates to move feed along said chamber towards said discharge outlet. An indexing mechanism is provided for the auger adapted to index individual turns thereof, whereby said feeder is adapted to supply feed to said discharge outlet in metered amounts. The feeder is formed as a base unit with a hopper unit mounted on the base unit, the base unit mounting said electric motor and battery holder, and the hopper unit comprising said hopper, said chamber and said auger, the hopper unit being freely separable from the base unit for cleaning or for filling the hopper with feed.

The term auger is used herein to refer to a mechanism that is mounted for rotation about its axis within a chamber, and, in so doing, to cause particulate material within the chamber to be carried by the auger in an axial direction. Examples of augers include a screw conveyor, in which the augur has a form similar to that of a simple corkscrew, and a helical wire.

Preferred embodiments of our feeder have one or more of the following features: The auger comprises a helical wire. The base unit includes a drive mechanism coupled to the motor and engageable with the auger for rotating the same when the hopper unit is mounted on the base unit. The indexing mechanism includes a switch adapted to be operated a set number of times in each rotation of the auger, the switch being coupled to a control circuit for controlling operation of the motor. Drive is provided to the auger from the motor via a drive mechanism; the indexing mechanism includes a reed switch adapted to be operated in each rotation of the auger, the reed switch being coupled to a control circuit for controlling operation of the motor; and the indexing mechanism further comprises a magnet mounted on the drive mechanism for rotation as the auger rotates to bring the magnet into confronting relation with the reed switch once in each rotation of the auger to provide a digital input for the control circuit. The control circuit is adapted to detect blockage of the auger by the feed and to cause temporary reverse running of the motor to seek to unblock the blockage. The control circuit is adapted to provide a visual and/or audible warning if the blockage is not removed after several attempts. The control circuit includes a timer and is programmable to operate the motor for a preselected number of turns of the auger at times set by a user.

BRIEF DESCRIPTION OF THE SEVERAL VIEWS OF THE DRAWINGS

Embodiments of feeder in accordance with the present teachings are described hereinbelow by way of example only with reference to the accompanying drawings, in which.

DETAILED DESCRIPTION OF THE INVENTION

Figure 1:
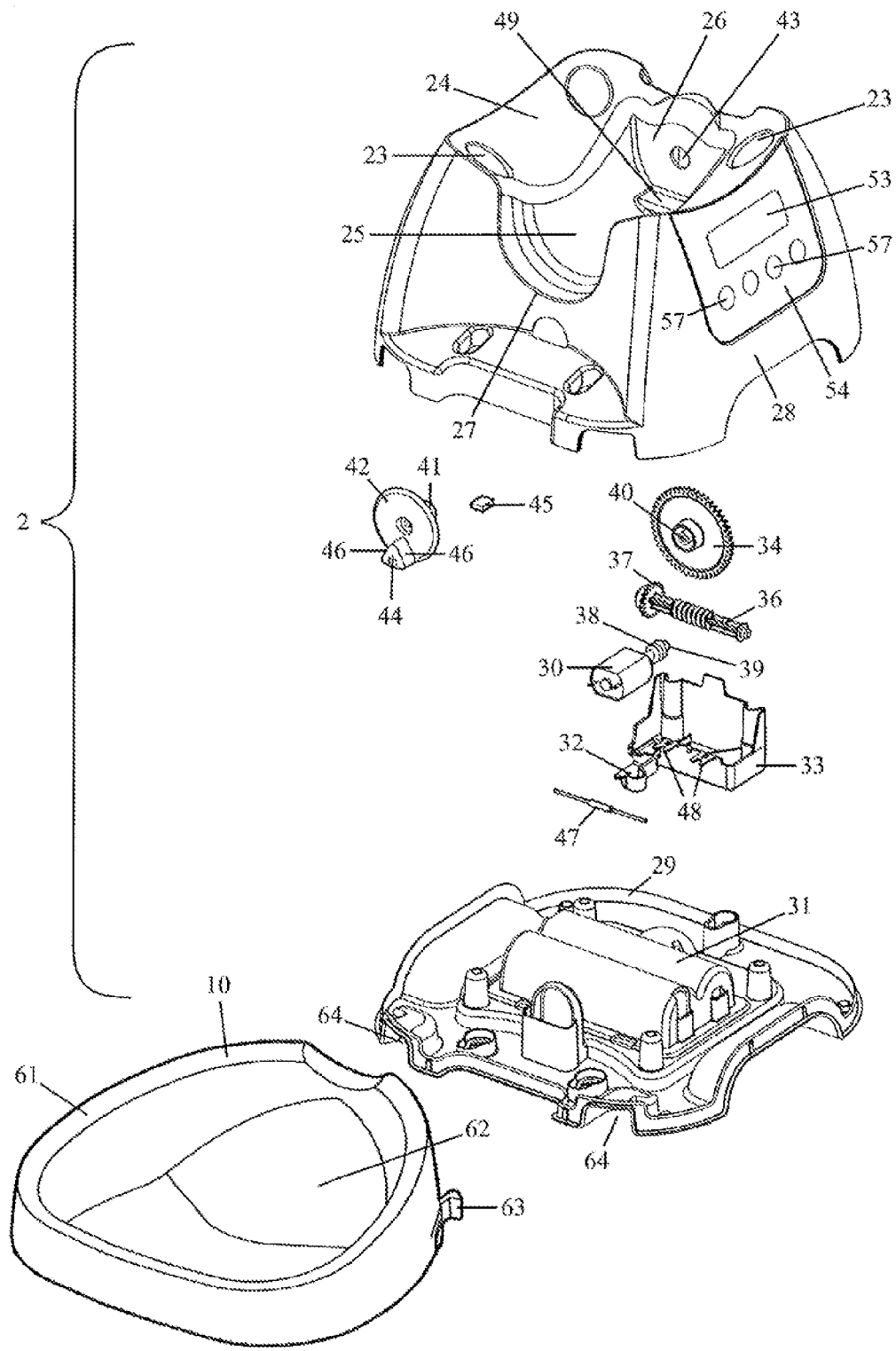
FIG. 1 is an exploded view of a base unit of a pet feeder.
Figure 2:
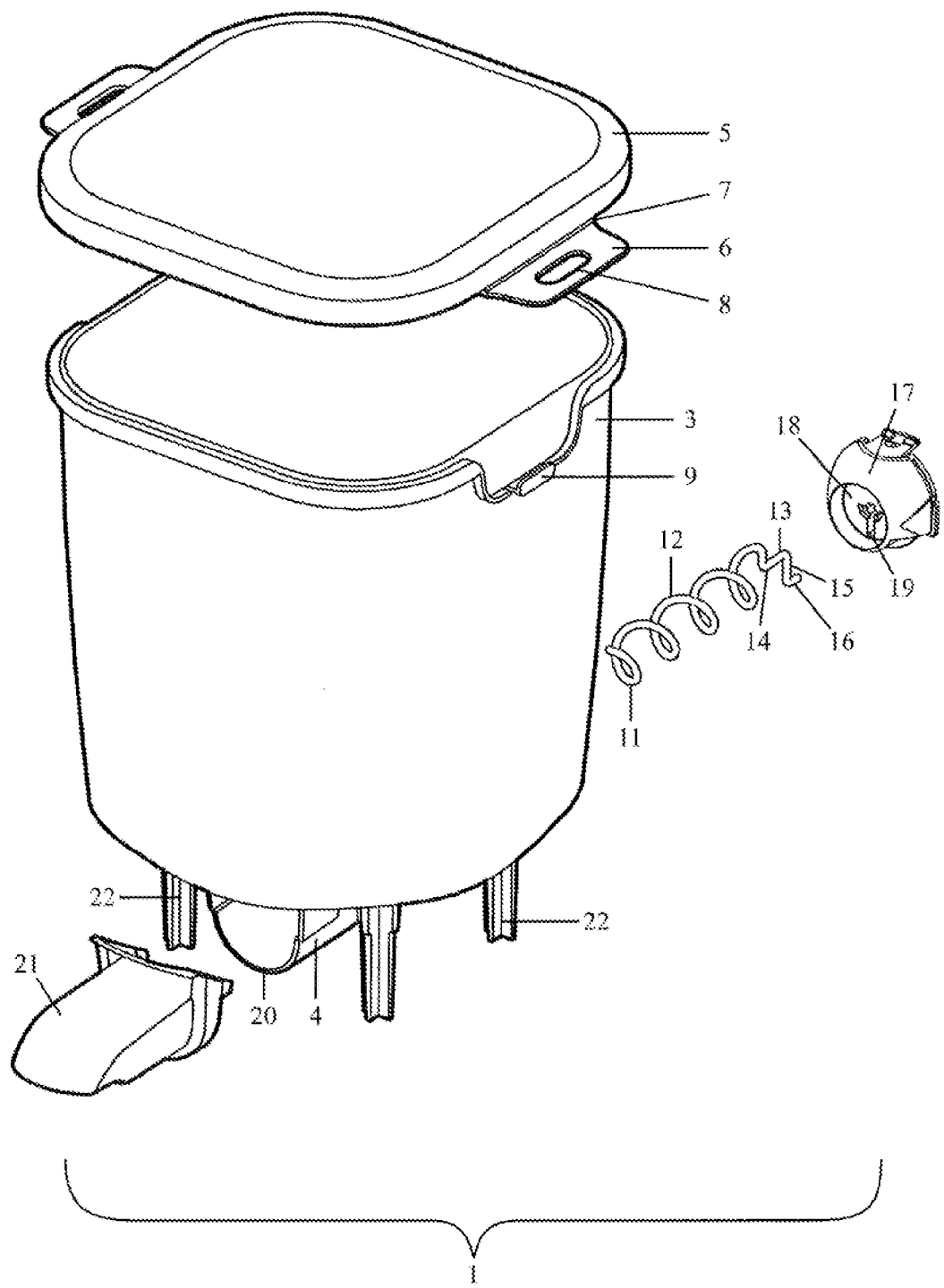
FIG. 2 is an exploded view of a hopper unit for cooperation with the base unit of FIG. 1.

The embodiment of pet feeder illustrated in the drawings is provided as two main components, namely a hopper unit 1, shown in exploded view in FIG. 2, and a base unit 2, shown in exploded view in FIG. 1, the hopper unit being freely separable from the base unit. When separated, the individual units may readily be cleaned and the hopper unit refilled with a fresh supply of feed when empty. Both units are readily portable in the illustrated embodiment.

The hopper unit comprises a hopper proper 3 from which dry petfood feeds by gravity into a chamber 4 beneath the hopper proper. A lid 5 is provided with catches 6 connected to the remainder of the lid by a live hinge 7, the catches 6 being provided with cut-outs 8 which snap over projections 9 on the outer wall of the hopper proper to provide an animal proof snap-fit closure.

As explained in more detail below, the chamber 4 is provided with a mechanism adapted to receive feed from a lower portion of the hopper and to supply it in metered amounts to a discharge outlet for discharge into a feeding receptacle 10 (FIG. 2) accessible to a pet. Because the chamber and its mechanism are carried by the hopper unit, separation of the two units can be achieved without remaining feed within the hopper unit immediately falling out.

An auger 11, here provided in the form of a helical wire 12 with a drive engaging portion 13 at one end, is mounted in the chamber 4. Drive engaging portion 13 comprises a portion 14 of wire that extends along the axis of the helix, a short portion 15 of wire that extends radially of that axis and a terminating portion 16 extending parallel to axial portion 14. The auger is mounted in a fitting 17 that plugs one axial end of chamber 4 so that axial portion 14 is received in a central through bore 18 of fitting 17, and radial portion 15 and terminating portion 16 pass through a slot 19 in the fitting 17, slot 19 being subsequently plugged, to lie outside chamber 4 for engagement with a drive mechanism as explained in more detail below. Thus the auger 11 is mounted in through bore 18 for rotation about the axis of the auger, which will cause feed within the chamber to be moved by the auger axially along the chamber towards its axial end 20 opposite fitting 17. A discharge nozzle 21 is fitted to axial end 20 to discharge feed into receptacle 10.

The base of hopper unit 1 is provided with four depending legs 22 adapted to be located in wells 23 in an upper surface 24 of base unit 2 which is curved to correspond to the configuration of the bottom of the hopper. Base unit 2 is also provided with a well 25 configured to accommodate the chamber 4. Wall 26 defines one axial end of well 25, the other axial end 27 of well 25 being open to allow discharge nozzle 21 to extend therethrough. Base unit 2 comprises a body 28 and a floor 29 to define with the body a hollow housing for accommodating components of a drive and control system. Batteries for driving an electric motor 30 are mounted within a battery housing 31 defined by floor 29 and a latchable closure, not shown, on the underside of floor 29. Motor 30 is supported by a ledge 32 integral with an auxiliary drive housing 33 which fits to the underside of body 28 so that a geared drive wheel 34 is located in the space defined between wall 26 and an outer surface 35 of the body. Drive wheel 34 is rotated by a worm drive 36 turned by a cog 37 at one axial end that is rotated in turn by a worm 38 mounted on shaft 39 of motor 30. A center fitting 40 of drive wheel 34 receives an axial projection 41 of a wheel 42 mounted against wall 26 so that projection 41 passes through an opening 43 in wall 26.

Figure 3:
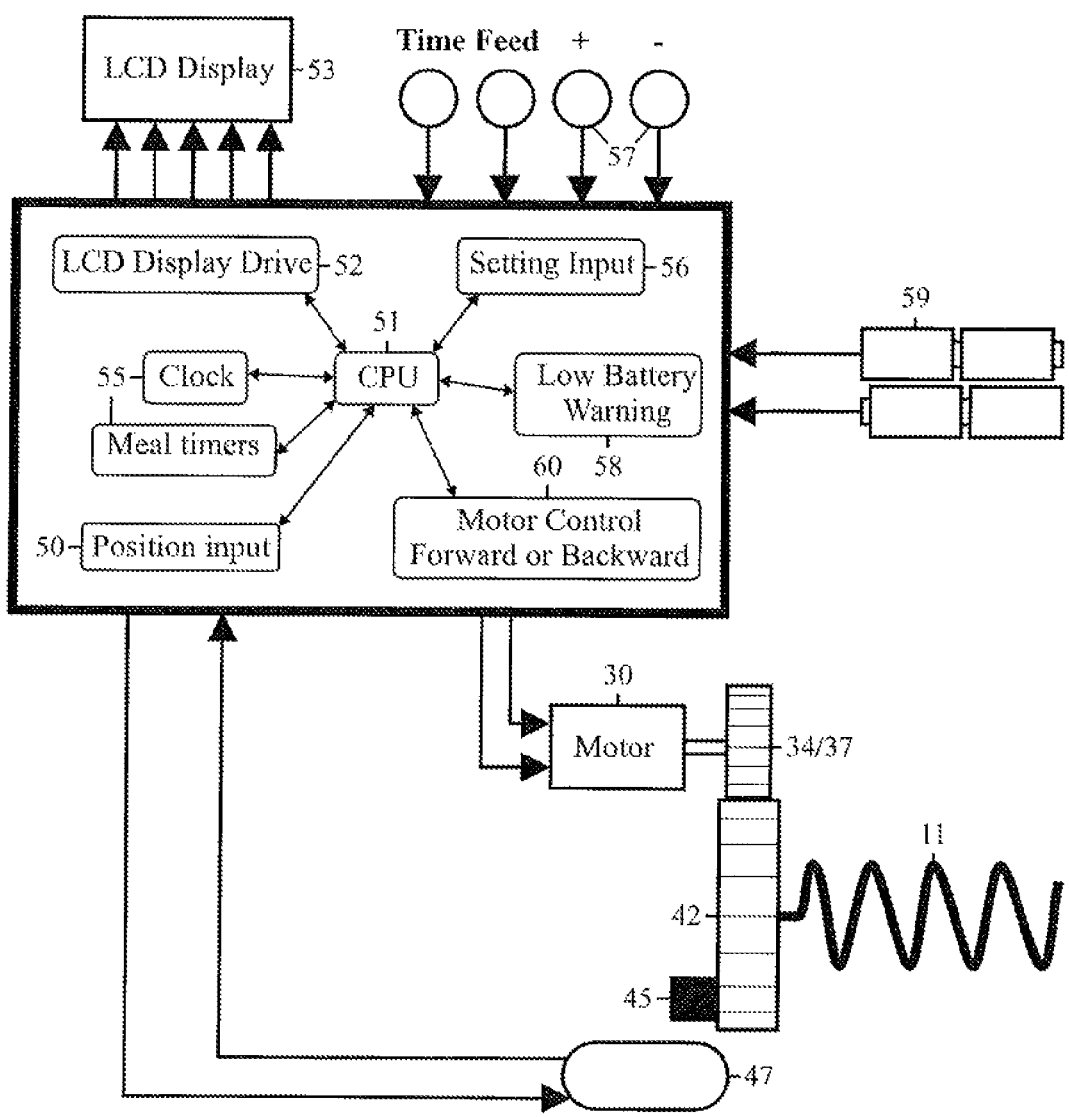
FIG. 3 is a generally schematic partly diagrammatic view of a drive and control system for the pet feeder of FIGS. 1 and 2.

Wheel 42 is provided with an indexing mechanism adapted to index individual turns of the augur, as a result of which the feeder is adapted to supply feed at the discharge nozzle 21 in metered amounts. The indexing mechanism includes a switch adapted to be operated a set number of times (in this embodiment, just once) in each revolution of wheel 42, and hence of the auger 11. In this embodiment, wheel 42 mounts an eccentric lug 44 which mounts a magnet 45. One or other of two side walls 46 of lug 44 are adapted to engage terminating portion 16 of auger 11 depending on the direction of rotation of motor 30. As the wheel rotates, once in each rotation, its magnet 45 comes into confronting relation with a reed switch 47 supported by brackets 48 projecting from auxiliary drive housing 33 so that the reed switch 47 is located in the space between body 28 and floor 29 just beneath a flat 49 defined at the base of wall 26. Reed switch 47 is included in a control circuit (FIG. 3) to provide a digital pulse position input 50 to a central processing unit 51. It will readily be appreciated by persons skilled in this field that other forms of switch actuated by rotation of the auger or of drive mechanism therefor may be similarly employed to provide a signal to a control circuit for the battery driven motor.

Central processing unit 51 is coupled to a drive 52 for a LCD display 53 visible in a control panel 54 on the exterior of base unit 2. Central processing unit 51 is also coupled to a clock timer 55 and to an input 56 controlled by push buttons 57 included in control panel 54. A low battery detection and warning system 58 is coupled to the central processing unit 51 and to the batteries 59 themselves. The warning may be visible and/or audible and may appear on LCD display 53. A motor control 60 is coupled to drive the motor 30 in accordance with the programming of central processing unit 51.

The use of an indexing mechanism that indexes individual turns provides much more accurate metering at reasonable cost than would be possible with a simple timer control alone for the motor. Thus the feeder may employ an inexpensive battery driven motor. Such motors exhibit significant variability. If the auger was simply set to rotate for a predetermined period of time at each feed, the quantity of feed discharged would depend upon the particular motor and also upon the battery voltage and the state of the battery at the time.

Receptacle 10 is formed as a shallow bowl 61 with a sloping wall 62 to guide dry petfood discharged from nozzle 21 into the bottom of the bowl. Angled projections 63 at the rear of receptacle 10 are a push fit into recesses 64 in floor 29. Receptacle 10 is not always required. Thus it is useful when the feeder is employed to feed cats, dogs, cage birds, rabbits or rodents. However, when the feeder is used to feed fish the discharge nozzle may be extended and simply discharge on to the surface of water within an aquarium or fish bowl. For chickens, the receptacle may or may not be used. Scratching and pecking for food on the ground is a natural habit for chickens, so that, while use of a receptacle may be tidier, discharge on to the ground may provide a more natural experience for the chickens. When the feeder is used to feed wild birds, in order to make it less readily accessible to squirrels, it may be set upon a pole or alternatively hung from above, and in some arrangements may dispense with a receptacle and simply discharge bird feed on to the ground beneath the feeder.

The feeder may be programmed in two different ways, depending upon the needs of the animals concerned.

In Standard Feed, meal times are set by the user employing buttons 57. When a set mealtime is reached, the motor is controlled to rotate a preset number of times, as detected by the magnet and reed switch, to serve a metered quantity of feed by rotating the auger by that number of turns to discharge the corresponding amount of feed through nozzle 21 into receptacle 10.

In Frequent Feed, meal times are set by a start time and an end time, and the quantity of feed to be fed between those times is also set. The motor is then rotated through one turn of the auger as detected by the magnet and reed switch at equal intervals between the start time and end time. For example, if the start time is set at 8:00 am and the end time is set at 9:00 am and the quantity of feed is set at seven turns of the augur, one turn will occur at each of 8:00 am, 8:10 am, 8:20 am, 8:30 am, 8:40 am, 8:50 am and 9:00 am.

Dogs generally prefer to eat all that is available at one go, so that Standard Feed may be more suitable for dogs, while some cats prefer to graze over a period, and for them the frequent Feed option may be preferred. Frequent feed is particularly suitable for feeding a diabetic dog or cat, as this prevents gorging, and is also suitable for surface feeding fish.

Figure 4:
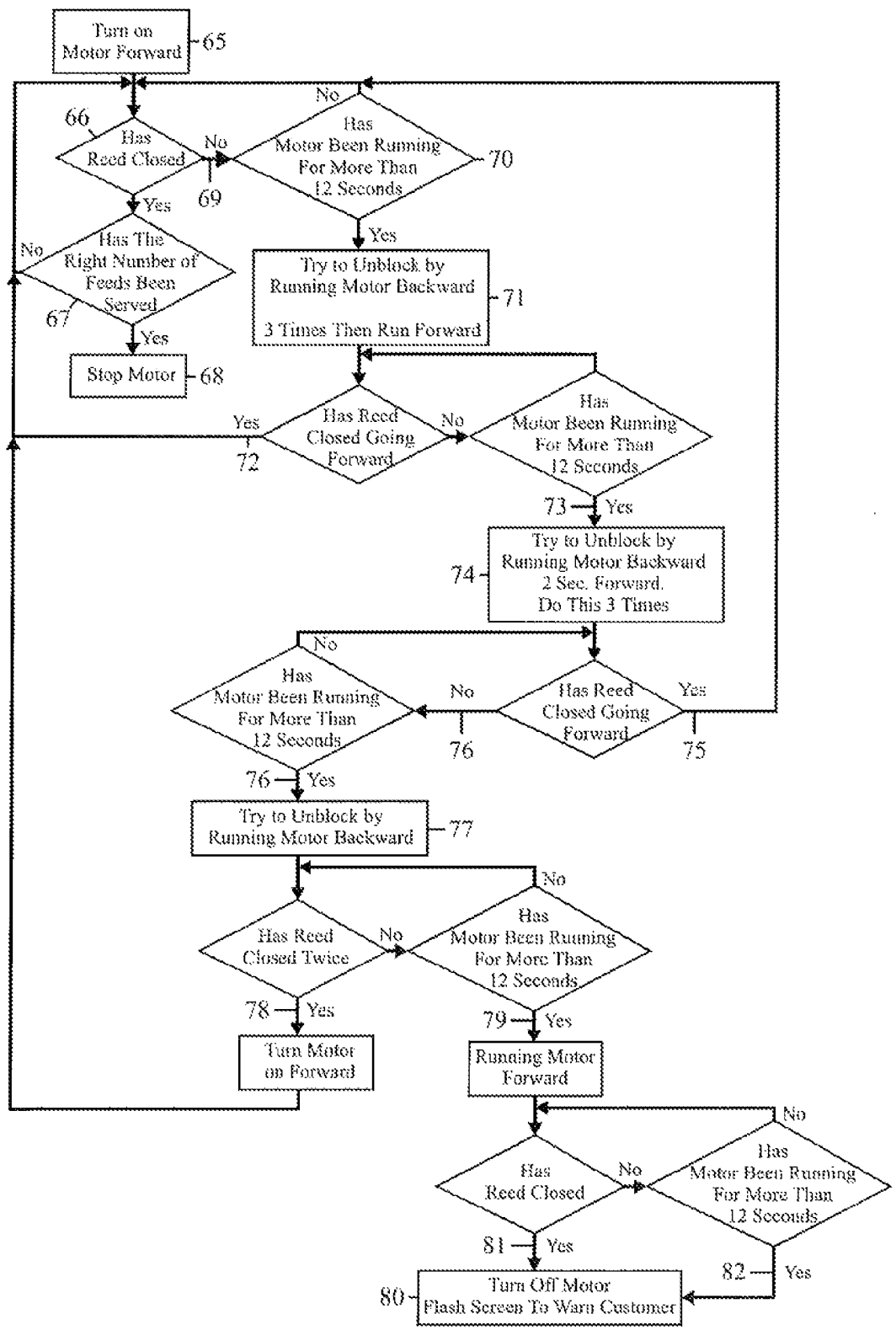
FIG. 4 is a logic flow diagram explaining how the drive and control system of FIG. 3 may be controlled to detect and seek to unblock a blockage in the feed.

The helical wire 12 is preferred for auger 11 for two reasons. It is relatively inexpensive. Also, as compared with other more solid augers, there is less risk of the feed causing a blockage. However, the system can readily be programmed to detect a blockage and to try to relieve it, as explained by reference to FIG. 4. Whether Standard or Frequent Feed is selected, when the motor is first turned on to cause feed to move in the forward direction towards nozzle 21 (Step 65), the system checks at Step 66 whether the reed switch closes. If it does, the system checks (Step 67) whether the required number of turns has been reached. If it has, the motor is stopped (Step 68); but if it has not, the motor is further rotated until the reed switch closes again (Step 66 repeated). If a reed switch check detects no closure (Step 69) and a check shows that the motor has been running for more than 12 seconds (Step 70), a first attempt is made in Step 71 to relieve the blockage by running the motor three times backwards for half a second and forward for half a second before resuming normal forward rotation. If the reed switch then closes on the forward turn (Step 72) all is well and the system returns to normal drive. However if the reed switch has still not closed after a further 12 seconds (Step 73), a second attempt is made in Step 74 to relieve the blockage by running the motor three times backwards for 2 seconds and forward for two seconds before resuming normal forward rotation. If the reed switch then closes on the forward turn (Step 75) all is well and the system returns to normal drive. However if the reed switch has still not closed after a further 12 seconds (Step 76), a third attempt is made in Step 77 to relieve the blockage by running the motor backwards. If the reed switch closes twice in this backward rotation of the auger (Step 78), this suggests that the problem may have been relieved and the system returns to normal drive. However, if the reed switch has not closed twice within 12 seconds of reverse rotation (Step 79), this suggests that there may be a blockage in the reverse direction as well as forwardly. Before turning the motor off (Step 80), an attempt is made to turn the motor forwardly until the reed switch closes (Step 81), because this position allows easy disengagement of the hopper unit from the base unit, which will be necessary to allow a user to manually relieve the blockage, but if the red switch has still not closed after a further 12 seconds (Step 82), the motor is turned off in Step 80 regardless. When the motor is turned off in Step 80, a warning is also generated visually on the LCD display 53 and/or audibly.

I claim:

1. A feeder apparatus for supplying dry feed to animals, the feeder apparatus comprising:
   a base unit having a battery powered electric motor and a battery holder, said battery holder suitable for receiving at least one battery so as to drive said electric motor solely by power from the at least one battery;
   a hopper unit mounted onto said base unit, said hopper unit comprising:
   a hopper adapted to hold the supply of dry feed therein;
   a chamber positioned adjacent a lower portion of said hopper, said chamber suitable for receiving the dry feed by gravity from said lower portion of said hopper, said chamber having a discharge outlet at one axial end thereof so as to allow for a discharge of the dry feed from said chamber; and
   an auger rotatably mounted about an axis in said chamber, said electric motor drivingly connected to said auger, said auger adapted to drive the feed along said chamber to said discharge outlet, said hopper unit being entirely freely separable as an entire unit from said base unit for cleaning said hopper or for filling said hopper with the dry feed, said hopper unit being replaceable as an entire unit onto said base unit after being separated therefrom; and
   an indexer cooperative with said auger so as to index in individual turns so as to supply feed in metered amounts to said discharge outlet of said chamber even as the battery power to the electric motor decreases,
   wherein each of the base unit and the hopper unit is individually constructed and arranged to be manually portable when separated.

2. The feeder apparatus of claim 1, said auger comprising a helical wire.

3. The feeder apparatus of claim 1, said base unit having a drive mechanism coupled to said electric motor, said drive mechanism engageable with said auger so as to rotate said auger.

4. The feeder apparatus of claim 3, said indexer having a reed switch adapted to be operated in each rotation of said auger, said reed switch being coupled to a control circuit for controlling operation of said electric motor, said indexer further comprising a magnet mounted on said drive mechanism for rotation as said auger rotates so as to bring said magnet into confronting relation with said reed switch once in each rotation of said auger so as to provide a digital input for said control circuit.

5. The feeder apparatus of claim 1, said indexer having a switch adapted to be operated a set number of times in each rotation of said auger, said switch coupled to a control circuit so as to control an operation of said electric motor.

6. The feeder apparatus of claim 5, said control circuit constructed and arranged to detect a blockage of said auger by the dry feed and suitable for causing a temporary reversal of said electric motor in order to unblock the blockage.

7. The feeder apparatus of claim 6, said control circuit adapted to provide a visual or audible warning if the blockage is not removed.

8. The feeder apparatus of claim 5, wherein said control circuit includes a timer and is programmable to operate said electric motor for a preselected number of turns of said auger at times set by the user.

* * * * *